(12) United States Patent
Zakrzewski et al.

(10) Patent No.: US 10,627,280 B2
(45) Date of Patent: Apr. 21, 2020

(54) INTEGRATED SENSOR UNIT FOR FUEL GAUGING

(71) Applicant: Simmonds Precision Products, Inc., Vergennes, VT (US)

(72) Inventors: Radoslaw Zakrzewski, South Burlington, VT (US); Michael A. Lynch, Shelburne, VT (US); Nghia T. Dinh, Burnsville, MN (US)

(73) Assignee: Simmonds Precision Products, Vergennes, VT (US)

( * ) Notice: Subject to any disclaimer, the term of this patent is extended or adjusted under 35 U.S.C. 154(b) by 58 days.

(21) Appl. No.: 15/489,504

(22) Filed: Apr. 17, 2017

(65) Prior Publication Data
US 2018/0299314 A1    Oct. 18, 2018

(51) Int. Cl.
| G01F 23/14 | (2006.01) |
| G01F 23/22 | (2006.01) |
| B64D 37/00 | (2006.01) |
| B64D 37/04 | (2006.01) |
| G01F 23/00 | (2006.01) |
| G01F 23/18 | (2006.01) |

(52) U.S. Cl.
CPC ........... *G01F 23/14* (2013.01); *B64D 37/005* (2013.01); *B64D 37/04* (2013.01); *G01F 23/0076* (2013.01); *G01F 23/18* (2013.01); *G01F 23/22* (2013.01)

(58) Field of Classification Search
CPC ............. G01F 23/0076; G01F 23/0069; G01F 23/0061; G01F 23/14; G01F 23/18; G01F 22/00; G01F 23/04; G01F 23/20; G01F 23/26; G01F 23/266; G01F 23/2927; G01F 23/296; G01F 23/2962; G01F 23/2963; G01F 23/72; G01F 23/74; B64D 37/02; B64D 37/04; B64D 37/005; B64D 37/00; B01F 23/2962; G01N 9/24
See application file for complete search history.

(56) References Cited

U.S. PATENT DOCUMENTS

| 4,815,323 A * | 3/1989 | Ellinger .............. G01F 23/2962 |
| | | 374/142 |
| 5,138,559 A | 8/1992 | Kuehl et al. |

(Continued)

FOREIGN PATENT DOCUMENTS

| CN | 103776473 A | 5/2014 |
| FR | 2976071 A1 | 12/2012 |
| WO | 2015188263 A1 | 12/2015 |

OTHER PUBLICATIONS

Extended European Search Report for EP Application No. 18155883.4, dated Sep. 13, 2018, 6 pages.

*Primary Examiner* — Randy W Gibson
*Assistant Examiner* — Gedeon M Kidanu
(74) *Attorney, Agent, or Firm* — Kinney & Lange, P.A.

(57) ABSTRACT

An integrated sensor unit for estimating a quantity of fluid in a container includes a pressure sensor configured to measure a pressure at a physical location of the sensor unit, an acceleration sensor configured to measure at least three components of an acceleration vector at the physical location of the sensor unit, and a temperature sensor configured to measure a temperature at the physical location of the sensor unit. The sensor unit is configured to produce an output signal comprising the pressure, acceleration, and temperature measurements.

19 Claims, 3 Drawing Sheets

(56) References Cited

U.S. PATENT DOCUMENTS

| | | | |
|---|---|---|---|
| 5,207,099 A | 5/1993 | Baker | |
| 5,386,736 A * | 2/1995 | Spillman, Jr. | G01F 23/0076 73/149 |
| 5,530,258 A * | 6/1996 | Crowne | G01F 23/0061 250/577 |
| 6,115,654 A | 9/2000 | Eid et al. | |
| 6,157,894 A * | 12/2000 | Hess | B64D 37/00 702/141 |
| 6,434,494 B1 * | 8/2002 | Forsythe, Jr. | G01F 23/0061 702/156 |
| 6,577,960 B1 * | 6/2003 | Rabelo | G01F 23/0069 702/55 |
| 9,138,091 B2 | 9/2015 | Zhao et al. | |
| 9,228,875 B2 | 1/2016 | Lingle et al. | |
| 9,429,459 B2 | 8/2016 | Marcos Montes et al. | |
| 2004/0052450 A1 * | 3/2004 | Morrison | G01F 23/0069 385/24 |
| 2004/0052477 A1 * | 3/2004 | Morrison | G01F 23/0069 385/88 |
| 2006/0025897 A1 * | 2/2006 | Shostak | B60C 23/005 701/1 |
| 2008/0149772 A1 * | 6/2008 | Sandiford | B64D 37/005 244/135 R |
| 2009/0045930 A1 * | 2/2009 | Fu | B60C 23/0408 340/447 |
| 2009/0234597 A1 | 9/2009 | Wilby | |
| 2014/0266065 A1 * | 9/2014 | Von Herzen | G01N 33/2888 320/137 |
| 2015/0022376 A1 * | 1/2015 | Zhang | G01F 23/26 340/870.37 |
| 2015/0075267 A1 * | 3/2015 | Sweppy | G01F 23/14 73/114.43 |
| 2015/0100253 A1 * | 4/2015 | Austerlitz | G01F 22/00 702/55 |
| 2017/0176235 A1 * | 6/2017 | Crowne | G01F 23/00 |
| 2017/0227454 A1 * | 8/2017 | Zakrzewski | G01N 21/31 |
| 2017/0228881 A1 * | 8/2017 | Zakrzewski | B64C 3/34 |
| 2017/0228883 A1 * | 8/2017 | Zakrzewski | G01F 25/0061 |
| 2017/0230635 A1 * | 8/2017 | Zakrzewski | G06T 15/005 |
| 2017/0328311 A1 * | 11/2017 | Franklin | B60K 15/03519 |
| 2018/0087475 A1 * | 3/2018 | Mills | B60K 15/03519 |

* cited by examiner

INTEGRATED SENSOR UNIT FOR FUEL GAUGING

BACKGROUND

On an aircraft, fuel is stored in tanks located within the wings, fuselage, or tail section. Accurately determining fuel levels within these fuel tanks is critical because the quantity of fuel determines the flight distance of the aircraft. Accurate fuel gauging can be challenging due to factors like complex fuel tank geometry and tank orientation during in-flight maneuvers.

The majority of fuel-gauging systems utilize capacitive probes disposed throughout a fuel tank to measure fuel quantity. Such systems can require a number of probes, including mounting hardware and wiring for each, to obtain accurate measurements. Alternatively, pressure-based systems measure hydrostatic pressure differential within the fuel tank to estimate fuel quantity. Such systems additionally rely on acceleration measurements from one or more independent accelerometers. Pressure-based systems generally require fewer sensors than capacitive-based systems, however, they are more sensitive to the impact of wing distortion on the fuel tank. Thus, a need exists for a system that can provide accurate measurements and account for wing bending, while requiring fewer components.

SUMMARY

An integrated sensor unit for estimating a quantity of fluid in a container includes a pressure sensor configured to measure a pressure at a physical location of the sensor unit, an acceleration sensor configured to measure at least three components of an acceleration vector at the physical location of the sensor unit, and a temperature sensor configured to measure a temperature at the physical location of the sensor unit. The sensor unit is configured to produce an output signal comprising the pressure, acceleration, and temperature measurements.

A system for estimating a quantity of fluid in a container includes a plurality of integrated sensor units and a remote data concentrator. Each of the of sensor units includes a pressure sensor configured to measure a pressure at a physical location of the sensor unit, an acceleration sensor configured to measure at least three components of an acceleration vector at the physical location of the sensor unit, and a temperature sensor configured to measure a temperature at the physical location of the sensor unit. Each of the sensor units is configured to provide an output signal comprising the pressure, acceleration, and temperature measurements to the remote data concentrator via a communication pathway.

A method of estimating a quantity of fluid in a container includes disposing a plurality of first integrated sensor units throughout the container, measuring a pressure at a physical location of each of the first integrated sensor units, and measuring at least three vectors of an acceleration vector at the physical location of each of the first integrated sensor units. The method further includes measuring a temperature at the physical location of each of the first integrated sensor units, providing the pressure, acceleration, and temperature measurements from each of the first integrated sensor units to a remote data concentrator, and calculating the quantity of the fluid within the first fluid container based on the pressure, acceleration, and temperature measurements.

DETAILED DESCRIPTION

The present disclosure relates to a fuel gauging system utilizing integrated sensor units. Each sensor unit includes a pressure, acceleration, and temperature sensor. This "three-in-one" configuration requires less wiring than three individual sensors. A number of sensor units can be disposed throughout each aircraft fuel tank to form a fuel gauging system.

Figure 1:
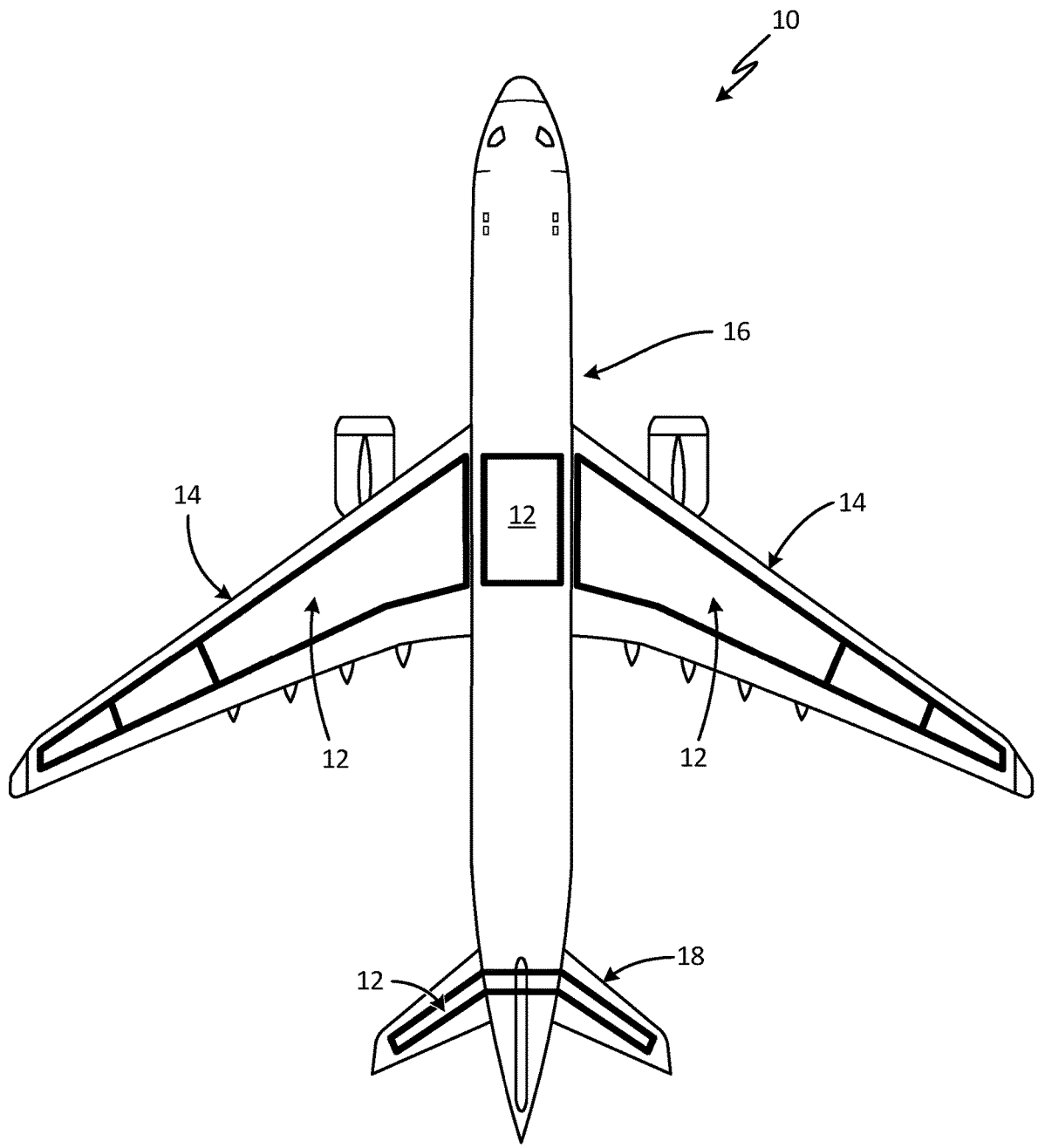
FIG. 1 is a simplified illustration of fuel tanks on an aircraft.

FIG. 1 shows aircraft 10 with a plurality of fuel tanks 12. Depending on the type and size of the aircraft, fuel tanks 12 can be located in any of wings 14, fuselage 16, or tail 18. Fuel tanks 12 can have simple or complex geometric shapes. Wings 14 can be formed from a flexible material, such as a composite material. Composite wings 14 are likely to experience more flexing and bending during a flight than traditional metal wings. For example, the position of a wing tip can move nearly two meters (up or down) from a normal position during climbing or descending maneuvers.

Figure 2:
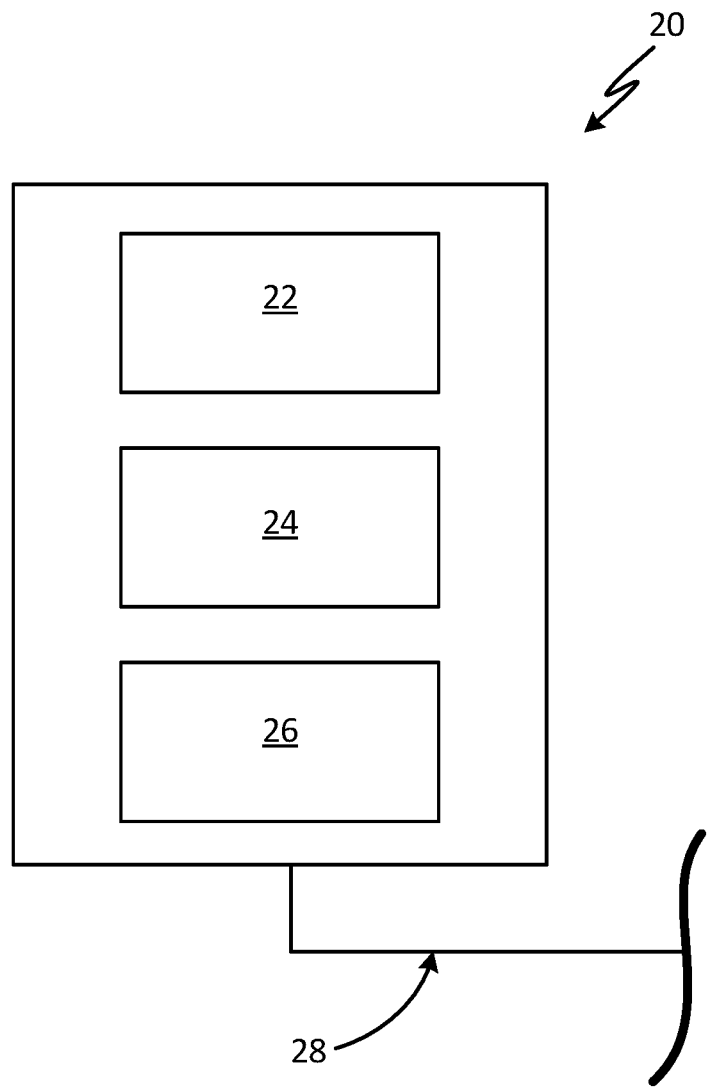
FIG. 2 is a schematic of an integrated sensing unit.

FIG. 2 is a schematic view of integrated sensor unit 20, configured to measure the quantity of fuel within fuel tank 12. Sensor unit 20 includes three collocated sensors—pressure sensor 22, accelerometer 24, and temperature sensor 26. Sensor unit 20 is configured to be disposed within fuel tank 12, and can be submerged in the fuel, or placed at some location outside the fuel, such as the fuel tank ullage. Sensor unit 20 can optionally contain more than one of each type of sensor.

Pressure sensor 22 can be an absolute pressure sensor. In the embodiment shown, pressure sensor 22 is a piezoresistive sensor, however, pressure sensor 22 can alternatively be an optical sensor, capacitive sensor, or another suitable pressure sensor. In some embodiments, multiple pressure sensors 22 can be used to infer differential pressure when placed at various locations within fuel tank 12. Accordingly, pressure sensor 22 is configured to measure fuel pressure or vapor pressure above the fuel, depending on the placement of sensor unit 20 within fuel tank 12.

Accelerometer 24 can be a differential capacitive, three-axis accelerometer, configured to provide measurements in three orthogonal directions. Each accelerometer 24 can have the same orientation as the other accelerometers 24. Alternatively, each accelerometer 24 can be oriented differently from the others, that is, each can be configured such that its axes are not aligned with those of the other accelerometers 24. Further, the axes of accelerometer 24 can be aligned with, or different from, the principal axes of aircraft 10. In some embodiments, accelerometer 24 can be configured to measure acceleration on more than three axes.

Temperature sensor 26 is configured to measure the temperature of the fuel or fuel vapor within fuel tank 12. Temperature sensor 26 can be any type of temperature sensor operationally suited for the environment of an aircraft fuel tank.

Figure 4:
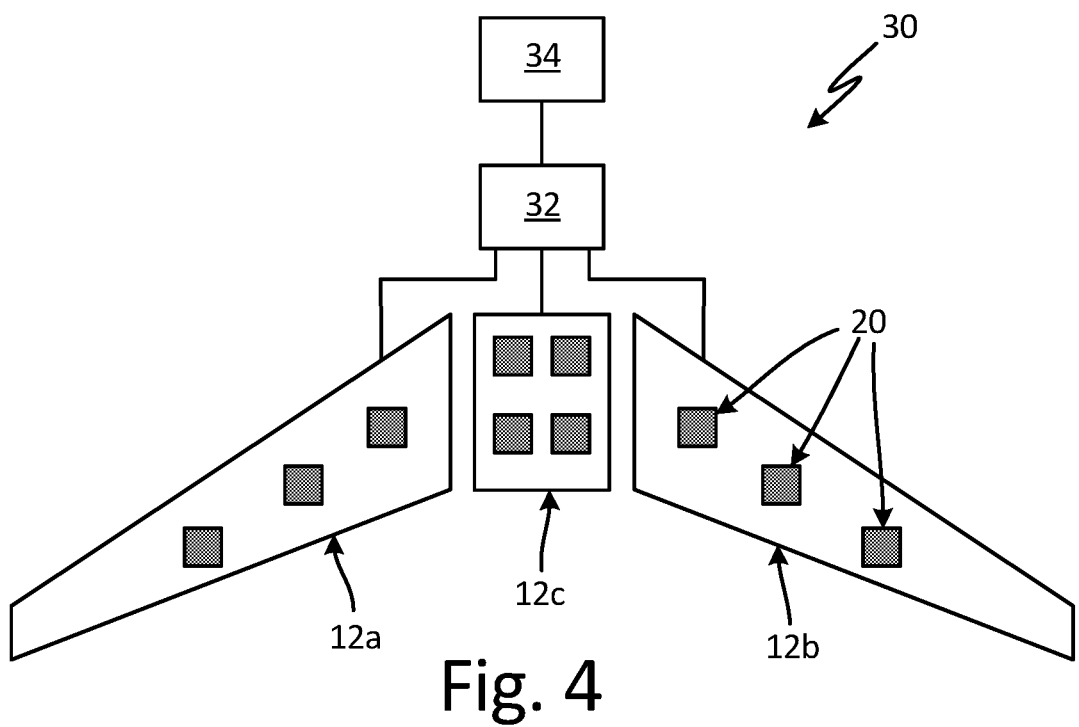
FIG. 4 is a schematic of the fuel gauging system incorporating multiple fuel tanks.

Sensor unit 20 can be an optically-interfaced sensor, such that it can be optically powered by, for example, a laser diode within a remote data concentrator (shown in FIG. 4). Sensor unit 20 can also be configured to output the combined measurement data (pressure, acceleration, and temperature) over communication pathway 28. Communication pathway 28 can be a fiber optic cable, or other suitable cable or wiring, and can deliver both data and power in exemplary embodiments.

Figure 3:
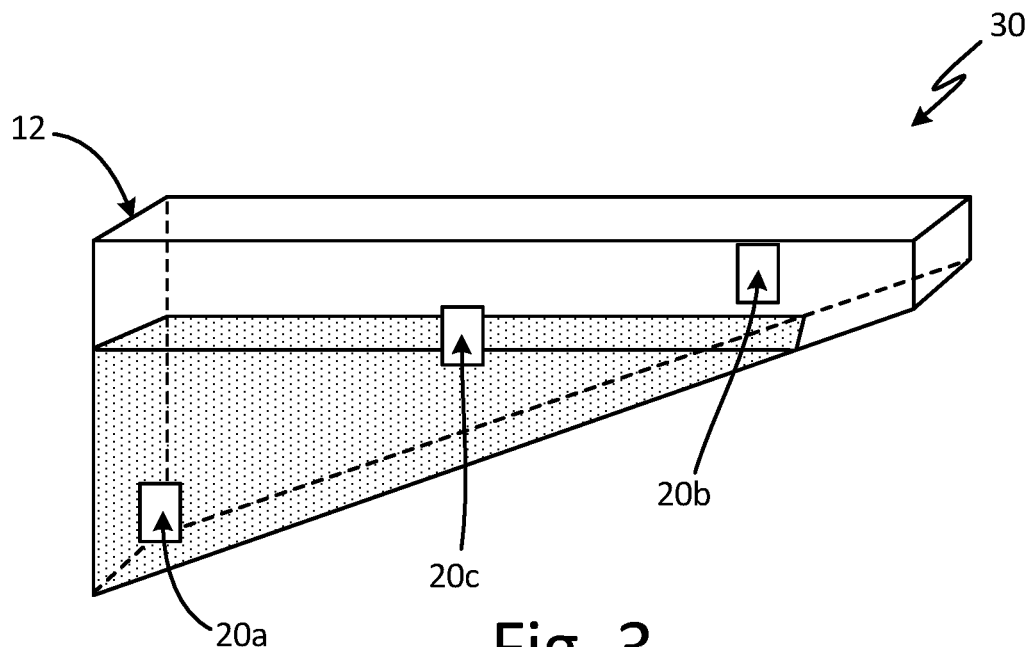
FIG. 3 is a schematic of a fuel gauging system within a fuel tank.

FIG. 3 shows fuel gauging system 30, which includes a plurality of sensor units 20 disposed throughout fuel tank 12. In the embodiment shown, fuel tank 12 is representative of a wing fuel tank, however, system 30 can be placed in any aircraft fuel tank. Sensor units 20 can be placed at various heights and/or locations of fuel tank 12, such that one or more sensor units 20 are submerged within the fuel, while one or more sensor units 20 are outside of the fuel. FIG. 3 shows three sensor units—one placed near the bottom of fuel tank 12 (20a), one in the ullage space (20b), and one at an intermediate point (20c). Although FIG. 3 shows three sensor units 20 in fuel tank 12, any number of sensor units 20 placed in a variety of locations within fuel tank 12 can be used, depending on the aircraft and fuel tank geometry.

FIG. 4 shows fuel gauging system 30 throughout multiple fuel tanks 12 of aircraft 10. System 30 includes a plurality of sensor units 20 disposed throughout left wing tank 12a, right wing tank 12b, and center tank 12c. Each of the sensor units 20 provides an output signal to remote data concentrator (RDC) 32. Sensor data is processed by processor 34 to calculate the quantity of fuel in the fuel tanks 12. The number of sensor units 20 shown in fuel tanks 12a, 12b, and 12c can vary depending on the required complexity of system 30. In other embodiments, system 30 can also include one or more sensor units 20 within a tail section fuel tank (not shown in FIG. 4).

Generally, system 30 operates to estimate the quantity of fuel in each fuel tank 12. Specifically, system 30 is configured to determine the mass of fuel on board aircraft 10, however, system 30 can also be configured to determine quantities other than mass. Direct mass measurements are not able to be taken in aircraft fuel tanks, therefore, system 30 measures other parameters from which the fuel mass is derived. These parameters include density, fuel height (or depth), and acceleration.

Each pressure sensor 22 measures the pressure of the fuel (or the ambient/vapor pressure outside of the fuel) at the location of sensor unit 20. Each pressure measurement is normalized by an acceleration measurement at the same location taken by accelerometer 24. That is, the pressure acting on the fuel at a given location is dependent on the magnitude of acceleration acting on the fuel (or fuel tank if placed outside of the fuel). The degree and direction of wing bending can be determined by comparing the change in direction of the acceleration vector with respect to a local coordinate frame (the housing of accelerometer 24). Temperature measurements taken by temperature sensors 26 are provided to account for the effects of fuel density variations due to stratification. All of the measurements taken by the sensor units 20 are provided to RDC 32, which then provides measurement data to processor 34. Processor 34 is configured to execute one or more algorithms on the measurement data to determine the mass of the fuel on board aircraft 10.

Fuel height can be determined with the pressure measurements from pressure sensors 22 and attitude measurements (local acceleration measurements combined with wing bending information) from accelerometer 24. Density ($\rho$) can then be determined using the fuel height (h), pressure (P), and acceleration (a), through the relationship represented as: $\rho = P/h*a$. The computation model(s) used by processor 34 can include a model of tank geometry, and can additionally include wing bending models. These models allow for the volume (V) of the fuel to be determined by fuel height measurements at various attitudes. With the volume of fuel known, fuel mass (m) can then be calculated from the relationship $m = V*\rho$.

Sensor units 20 and fuel gauging system 30 have many benefits over fuel gauging systems of the prior art. First, the collocation of pressure sensors 22 and accelerometers 24 provides more accurate measurements than other systems that often include fewer accelerometers than pressure sensors, with the accelerometers being located apart from the pressure sensors. Second, the collocation of pressure sensors 22 and accelerometers 24 allows for the use of less accurate (and less expensive) accelerometers 24. Prior art systems having only one or relatively few accelerometers require more accurate instruments to meet fuel-gauging accuracy requirements.

Fuel gauging system 30 requires less wiring and other hardware than comparable systems because three sensors are integrated into one sensor unit 20. Thus, the integrated units require less assembly time, and offer greater reliability due to the reduced amount of components that can wear/fatigue/fail over time. Further, depending on the type of wiring used, the reduced number of wires means a less complex system, thereby lowering costs associated with safety measures intended to reduce the possibility of fuel ignition within the fuel tanks.

System 30 is highly customizable for any type of aircraft, as it can include any number of units in any fuel tank, depending on budget, tank geometry, and fuel-gauging accuracy requirements, to name a few examples. Finally, the use of system 30 on an aircraft or other platform requires only a single sensor type applicable to all fuel gauging applications.

It should also be appreciated that integrated sensor units 20 of fuel gauging system 30 can be used for any type of civil or military aircraft. Further, although the disclosed embodiments are applied to the aviation field, sensor units 20 of system 30 can be used for any fluid gauging application.

Discussion of Possible Embodiments

The following are non-exclusive descriptions of possible embodiments of the present invention.

An integrated sensor unit for estimating a quantity of fluid in a container includes a pressure sensor configured to measure a pressure at a physical location of the sensor unit, a multi-axis acceleration sensor configured to measure at least three components of an acceleration vector at the physical location of the sensor unit, and a temperature sensor configured to measure a temperature at the physical location of the sensor unit. The sensor unit is configured to produce an output signal comprising the pressure, acceleration, and temperature measurements.

The unit of the preceding paragraph can optionally include, additionally and/or alternatively, any one of the following features, configurations and/or additional components:

The fluid is an aviation fluid, and the container is an aircraft fuel tank.

The pressure sensor is configured to sense an absolute pressure.

The pressure sensor is one of: a piezo-resistive pressure sensor, a capacitive pressure sensor, and an optical pressure sensor.

The acceleration sensor is a three-axis acceleration sensor.

The three-axis acceleration sensor is a differential capacitive sensor.

A system for estimating a quantity of fluid in a container includes a plurality of integrated sensor units and a remote data concentrator. Each of the of sensor units includes a pressure sensor configured to measure a pressure at a physical location of the sensor unit, an acceleration sensor configured to measure at least three components of an acceleration vector at the physical location of the sensor unit, and a temperature sensor configured to measure a temperature at the physical location of the sensor unit. Each of the sensor units is configured to provide an output signal comprising the pressure, acceleration, and temperature measurements to the remote data concentrator via a communication pathway.

The system of the preceding paragraph can optionally include, additionally and/or alternatively, any one of the following features, configurations and/or additional components:

A processor is configured to perform computations on the pressure, acceleration, and temperature measurements.

The fluid is an aviation fuel, and the container is an aircraft fuel tank.

At least one of the sensor units is disposed within a first wing tank.

At least one of the sensor units is disposed within a second wing tank.

At least one of the sensor units is disposed within a fuselage tank.

The communication pathway is a fiber optic cable

The remote data concentrator is configured to power each sensor unit.

A method of estimating a quantity of fluid in a container includes disposing a plurality of first integrated sensor units throughout the container, measuring a pressure at a physical location of each of the first integrated sensor units, and measuring at least three components of an acceleration vector at the physical location of each of the first integrated sensor units. The method further includes measuring a temperature at the physical location of each of the first integrated sensor units, providing the pressure, acceleration, and temperature measurements from each of the first integrated sensor units to a remote data concentrator, and calculating the quantity of the fluid within the first fluid container based on the pressure, acceleration, and temperature measurements.

The method of the preceding paragraph can optionally include, additionally and/or alternatively, any one of the following features, configurations and/or additional components:

The method includes disposing a plurality of second integrated sensor units throughout a second container and calculating the fluid quantity within the second container.

The method includes determining a bending of the container at the physical location of each of the first integrated sensor units.

Measuring a pressure includes one of measuring a pressure of the fluid and measuring a pressure of a vapor within the container.

Calculating the quantity of the fluid includes operation of a processor configured to execute at least one algorithm based on a relationship between the pressure, acceleration, and temperature measurements.

Calculating a quantity of the fluid includes calculating a mass of the fluid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for estimating a quantity of fluid in a flexible composite container, the system comprising:
   a plurality of integrated sensor units, each of the sensor units comprising:
      a pressure sensor configured to measure a pressure at a physical location of the sensor unit;
      an acceleration sensor physically collocated with the pressure sensor and configured to measure at least three components of an acceleration vector at the physical location of the sensor unit; and
      a temperature sensor physically collocated with the pressure sensor and the acceleration sensor and configured to measure a temperature at the physical location of the sensor unit;
   a remote data concentrator; and
   a processor configured to utilize a model of container geometry and a change in direction of the acceleration vector with respect to a local coordinate frame for each of the plurality of integrated sensor units to determine a degree of container bending;
   wherein each of the sensor units is configured to provide an output signal comprising the pressure, acceleration, and temperature measurements to the remote data concentrator via a communication pathway.

2. The system of claim 1 wherein the processor is configured to perform computations on the pressure, acceleration, and temperature measurements, as well as the degree of container bending.

3. The system of claim 1, wherein the fluid is an aviation fuel, and wherein the container is an aircraft fuel tank.

4. The system of claim 1, wherein the communication pathway is a fiber optic cable.

5. The system of claim 1, wherein the remote data concentrator is configured to power each sensor unit.

6. The system of claim 1, wherein the local coordinate frame is a housing of the acceleration sensor.

7. The system of claim 1, wherein each pressure sensor is configured to sense an absolute pressure.

8. The system of claim 7, wherein each pressure sensor is one of:
   a piezo-resistive pressure sensor;
   a capacitive pressure sensor; and
   an optical pressure sensor.

9. The system of claim 1, wherein each acceleration sensor is a three-axis acceleration sensor.

10. The system of claim 9, wherein each three-axis acceleration sensor is a differential capacitive sensor.

11. The system of claim 1, wherein at least one of the sensor units is disposed within a first wing tank.

12. The system of claim 11, wherein at least two of the sensor units are disposed in the first wing tank, one of the at least two sensors being positioned at a bottom of the first wing tank, and the other of the at least two sensors being positioned at an intermediate location of the first wing tank.

13. The system of claim 11, wherein at least one of the sensor units is disposed within a second wing tank.

14. The system of claim 13, wherein at least one of the sensor units is disposed within a fuselage tank.

15. A method of estimating a quantity of fluid in a first flexible composite container, the method comprising:
- disposing a plurality of first integrated sensor units throughout the first container, each of the integrated sensor units comprising:
  - a pressure sensor configured to measure a pressure a physical location of the sensor unit;
  - an acceleration sensor physically collocated with the pressure sensor and configured to measure at least three components of an acceleration vector at the physical location of the sensor unit; and
  - a temperature sensor physically collocated with the pressure sensor and the acceleration sensor and configured to measure a temperature at the physical location of the sensor unit;
- measuring a pressure at a physical location of each of the first integrated sensor units;
- measuring at least three components of an acceleration vector at the physical location of each of the first integrated sensor units;
- determining a bending of the container at the physical location of each of the first sensor units using a measured change in the acceleration vector with respect to a local coordinate frame for each of the first sensor units, and a model of container geometry;
- measuring a temperature at the physical location of each of the first integrated sensor units;
- providing the pressure, acceleration, and temperature measurements from each of the first integrated sensor units to a remote data concentrator; and
- calculating the quantity of the fluid within the first container based on the pressure, acceleration, and temperature measurements, as well as a degree of container bending.

16. The method of claim 15 and further comprising: disposing a plurality of second integrated sensor units throughout a second container and calculating the fluid quantity within the second container.

17. The method of claim 15, wherein measuring the pressure at the physical location of each of the first integrated sensor units comprises one of:
- measuring a pressure of the fluid; and
- measuring a pressure of a vapor within the container.

18. The method of claim 15, wherein calculating the quantity of the fluid further comprises operation of a processor configured to execute at least one algorithm based on a relationship between the pressure, acceleration, and temperature measurements.

19. The method of claim 18, wherein calculating a quantity of the fluid comprises calculating a mass of the fluid.

* * * * *